(12) United States Patent
Ahadian et al.

(10) Patent No.: US 9,047,337 B2
(45) Date of Patent: Jun. 2, 2015

(54) DATABASE CONNECTIVITY AND DATABASE MODEL INTEGRATION WITHIN INTEGRATED DEVELOPMENT ENVIRONMENT TOOL

(75) Inventors: Azadeh Ahadian, San Jose, CA (US); Stephen Andrew Brodsky, Los Gatos, CA (US); Ardeshir Jamshidi, San Jose, CA (US); Rebecca B. Nin, Morgan Hill, CA (US); Brian Gerrit Payton, San Jose, CA (US); Sonali Surange, San Rafael, CA (US)

(73) Assignee: International Business Machines Corporation, Armonk, NY (US)

( * ) Notice: Subject to any disclaimer, the term of this patent is extended or adjusted under 35 U.S.C. 154(b) by 1672 days.

(21) Appl. No.: 11/741,683

(22) Filed: Apr. 27, 2007

(65) Prior Publication Data

US 2008/0270983 A1    Oct. 30, 2008

(51) Int. Cl.
G06F 9/44 (2006.01)
G06F 17/30 (2006.01)
G06F 11/36 (2006.01)

(52) U.S. Cl.
CPC ............ *G06F 17/30389* (2013.01); *G06F 8/33* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 5,675,801 A | 10/1997 | Lindsey | |
| 5,701,400 A | 12/1997 | Amado | |
| 5,754,858 A | 5/1998 | Broman et al. | |
| 5,897,949 A | 4/1999 | Lühmann et al. | |
| 6,006,224 A * | 12/1999 | McComb et al. | 1/1 |
| 6,073,126 A * | 6/2000 | Endo et al. | 706/45 |
| 6,097,995 A * | 8/2000 | Tipton et al. | 700/266 |
| 6,240,417 B1 | 5/2001 | Eastwick et al. | |
| 6,298,342 B1 | 10/2001 | Graefe et al. | |
| 6,341,288 B1 | 1/2002 | Yach et al. | |
| 6,353,820 B1 | 3/2002 | Edwards et al. | |
| 6,446,256 B1 | 9/2002 | Hyman et al. | |
| 6,473,768 B1 | 10/2002 | Srivastava et al. | |
| 6,496,833 B1 | 12/2002 | Goldberg et al. | |
| 6,507,834 B1 | 1/2003 | Kabra et al. | |
| 6,591,272 B1 | 7/2003 | Williams | |
| 6,594,653 B2 | 7/2003 | Colby et al. | |
| 6,629,094 B1 | 9/2003 | Colby et al. | |
| 6,658,426 B1 | 12/2003 | Poskanzer | |

(Continued)

FOREIGN PATENT DOCUMENTS

EP    1251423 A2    10/2002

OTHER PUBLICATIONS

"Eclipse Database Explorer—Database browser, SQL editor, ERD Specialized Oracle Connector, JDBC connection templates for all relational databses", Mar. 25, 2006, pp. 1-8.*

(Continued)

*Primary Examiner* — Li B Zhen
*Assistant Examiner* — Lenin Paulino
(74) *Attorney, Agent, or Firm* — Patterson & Sheridan, LLP

(57) ABSTRACT

Embodiments of the invention provide database integration within an integrated development environment (IDE) tool for displaying database structure and other database information, query editing and execution, and error detection for database statements embedded in program source code. Embodiments of the invention integrate database connectivity and error detection into the IDE tool, thereby potentially reducing the time required for database-aware application development.

23 Claims, 12 Drawing Sheets

(56) References Cited

U.S. PATENT DOCUMENTS

| | | | |
|---|---|---|---|
| 6,658,646 B1 | 12/2003 | Hernandez, III | |
| 6,799,184 B2 | 9/2004 | Bhatt et al. | |
| 6,799,718 B2* | 10/2004 | Chan et al. | 235/375 |
| 7,047,518 B2 | 5/2006 | Little et al. | |
| 7,054,924 B1 | 5/2006 | Harvey et al. | |
| 7,072,983 B1 | 7/2006 | Kanai et al. | |
| 7,076,772 B2* | 7/2006 | Zatloukal | 717/147 |
| 7,086,009 B2 | 8/2006 | Resnick et al. | |
| 7,107,578 B1* | 9/2006 | Alpern | 717/124 |
| 7,110,936 B2 | 9/2006 | Hiew et al. | |
| 7,137,100 B2 | 11/2006 | Iborra et al. | |
| 7,240,340 B2 | 7/2007 | Vaidyanathan et al. | |
| 7,251,669 B1* | 7/2007 | Arora | 707/695 |
| 7,350,192 B2 | 3/2008 | Seitz et al. | |
| 7,421,680 B2 | 9/2008 | DeLine et al. | |
| 7,516,128 B2 | 4/2009 | Colby et al. | |
| 7,539,973 B2 | 5/2009 | Hodge | |
| 7,650,592 B2 | 1/2010 | Eckels et al. | |
| 7,665,058 B2 | 2/2010 | Vogel et al. | |
| 7,681,176 B2 | 3/2010 | Wills et al. | |
| 7,685,194 B2 | 3/2010 | Kabra et al. | |
| 7,689,614 B2 | 3/2010 | de la Iglesia et al. | |
| 7,707,550 B2 | 4/2010 | Resnick et al. | |
| 7,725,460 B2 | 5/2010 | Seitz et al. | |
| 7,756,850 B2 | 7/2010 | Keith, Jr. | |
| 7,761,443 B2 | 7/2010 | Bhaghavan et al. | |
| 7,774,333 B2 | 8/2010 | Colledge et al. | |
| 7,788,085 B2 | 8/2010 | Brun et al. | |
| 7,792,836 B2 | 9/2010 | Taswell | |
| 7,792,851 B2* | 9/2010 | Berg et al. | 707/759 |
| 7,797,303 B2 | 9/2010 | Roulland et al. | |
| 7,801,882 B2 | 9/2010 | Cunningham et al. | |
| 8,090,735 B2 | 1/2012 | Bireley et al. | |
| 8,095,823 B2 | 1/2012 | Griffith et al. | |
| 2001/0011371 A1* | 8/2001 | Tang | 717/9 |
| 2002/0016953 A1 | 2/2002 | Sollich | |
| 2002/0059444 A1 | 5/2002 | Shinno | |
| 2002/0156772 A1 | 10/2002 | Chau et al. | |
| 2002/0178434 A1 | 11/2002 | Fox et al. | |
| 2003/0004979 A1 | 1/2003 | Woodring | |
| 2003/0041052 A1 | 2/2003 | Gajda et al. | |
| 2003/0055826 A1* | 3/2003 | Graham | 707/10 |
| 2003/0074358 A1 | 4/2003 | Sarbaz et al. | |
| 2003/0172076 A1* | 9/2003 | Arnold et al. | 707/100 |
| 2003/0200212 A1 | 10/2003 | Benson et al. | |
| 2003/0229885 A1 | 12/2003 | Gownder et al. | |
| 2004/0003371 A1 | 1/2004 | Coulthard et al. | |
| 2004/0044687 A1 | 3/2004 | Vachuska et al. | |
| 2004/0064788 A1 | 4/2004 | Gownder et al. | |
| 2004/0078470 A1 | 4/2004 | Baumeister et al. | |
| 2004/0267690 A1* | 12/2004 | Bhogal et al. | 707/1 |
| 2005/0027702 A1 | 2/2005 | Jensen et al. | |
| 2005/0091366 A1 | 4/2005 | Acharya | |
| 2005/0114771 A1 | 5/2005 | Piehler et al. | |
| 2005/0120014 A1 | 6/2005 | Deffler | |
| 2005/0160104 A1 | 7/2005 | Meera et al. | |
| 2005/0182758 A1 | 8/2005 | Seitz et al. | |
| 2005/0210374 A1 | 9/2005 | Lander | |
| 2005/0229154 A1 | 10/2005 | Hiew et al. | |
| 2005/0256852 A1 | 11/2005 | McNall et al. | |
| 2005/0256907 A1 | 11/2005 | Novik et al. | |
| 2005/0262046 A1 | 11/2005 | Day et al. | |
| 2005/0278270 A1 | 12/2005 | Carr et al. | |
| 2006/0005169 A1* | 1/2006 | Berstis et al. | 717/125 |
| 2006/0020619 A1 | 1/2006 | Netz et al. | |
| 2006/0020933 A1 | 1/2006 | Pasumansky et al. | |
| 2006/0041864 A1 | 2/2006 | Holloway et al. | |
| 2006/0075120 A1 | 4/2006 | Smit | |
| 2006/0085400 A1 | 4/2006 | Minore et al. | |
| 2006/0112067 A1 | 5/2006 | Morris | |
| 2006/0156286 A1* | 7/2006 | Morgan et al. | 717/124 |
| 2006/0179027 A1 | 8/2006 | Bechtel et al. | |
| 2006/0236304 A1 | 10/2006 | Luo et al. | |
| 2006/0242077 A1 | 10/2006 | Dettinger et al. | |
| 2006/0248045 A1 | 11/2006 | Toledano et al. | |
| 2006/0278270 A1 | 12/2006 | Jones | |
| 2007/0011651 A1 | 1/2007 | Wagner | |
| 2007/0044066 A1* | 2/2007 | Meijer et al. | 717/100 |
| 2007/0050348 A1 | 3/2007 | Aharoni et al. | |
| 2008/0162445 A1 | 7/2008 | Ghazal | |
| 2008/0172360 A1 | 7/2008 | Lim et al. | |
| 2008/0189240 A1 | 8/2008 | Mullins et al. | |
| 2008/0222129 A1 | 9/2008 | Komatsu et al. | |
| 2008/0270343 A1 | 10/2008 | Brodsky et al. | |
| 2008/0270980 A1 | 10/2008 | Ahadian et al. | |
| 2008/0270989 A1 | 10/2008 | Ahadian et al. | |
| 2008/0320013 A1 | 12/2008 | Bireley et al. | |
| 2008/0320441 A1 | 12/2008 | Ahadian et al. | |

OTHER PUBLICATIONS

MyEclipse, Eclipse Database Explorer, 2006.*
Cao et al., "Design and implementation for SQL parser based on ANTLR," 2010 2nd International Conference on Computer Engineering and Technology (ICCET), Apr. 2010, vol. 4: pp. 276-279.
Ghodke et al., "Fast Query for Large Treebanks," HLT '10 Human Language Technologies: the 2010 Annual Conference of the North American Chapter of the Association of Computational Linguistics, Jun. 2010: pp. 267-275.
Kats et al., "The Spoofax Language Workbench," Spash '10 Proceedings of the ACM International Conference Companion on Object Oriented Programming Systems Languages and Applications Companion, 2010: pp. 444-463.
Koch, "A Computational Semantic Approach Applied to Simple Database Queries," IEEE 2003 International Conference on Natural Language Processing and Knowledge Engineering, Oct. 2003, pp. 388-393.
Office Action History of U.S. Appl. No. 11/741,631 from Oct. 14, 2010 to Mar. 4, 2011.
Wu et al., "Integrating Diverse CIM Data Bases: The Role of Natural Language Interface," IEEE Transactions on Systems, Man, and Cybernetics, Nov./Dec. 1992, vol. 22(6): pp. 1331-1347.
Zhang et al., "Understanding Web Query Interfaces: Best-Effort Parsing with Hidden Syntax," SIGMOD '04 Proceedings of the 2004 ACM SIGMOD International Conference on Management of Data, Jun. 2004: pp. 107-118.
G. P. Fitzpatrick et al., "Source Code Critical Region Hyper-Data", IBM Technical Disclosure Bulletin, vol. 36, No. 06B, pp. 353-354, Jun. 1993.
D. Abramson and R. Sosic, "A Debugging and Testing Tool for Supporting Software Evolution", Journal of Automated Software Engineering, vol. 3, pp. 369-390, 1996.
Dennis Brylow and Jens Palsberg, "Deadline Analysis of Interrupt-driven Software", Proceedings of the 9th European software engineering conference held jointly with 11th ACM SIGSOFT international symposium on Foundations of software engineering, vol. 28, pp. 198-207, 2003.
Ahadian et al., "Detecting and Displaying Errors in Database Statements within Integrated Development Environment Tool", U.S. Appl. No. 11/741,631, Apr. 27, 2007.
Brodsky et al., "Processing Database Queries Embedded in Application Source Code from within Integrated Development Environment Tool", U.S. Appl. No. 11/741,672, Apr. 27, 2007.
PCT International Search Report and Written Opinion for PCTEP2008/053831, dated Mar. 31, 2008.
Charles Z. Mitchell, "Engineering VAX Ada for a Multi-Language Programming Environment", ACM SIGSOFT/SIGPLAN software engineering symposium on Practical software development environments, 1987, pp. 49-58.
Hartrum et al., "The AFIT Wide Spectrum Object Modeling Environment: An Awsome Beginning", Proceedings of the IEEE 2000 National Aerospace and Electronics Conference, pp. 35-42, Oct. 10-12, 2000.
J. Liberty, "Safari Books Online,"Visual C#2005: A Developer's Notebook, Apr. 2005, Retreived from http://proquest.safaribooksonline.com/059600799x?tocview=true.
PCT International Search Report & Written Opinion for PCT/EP2008/053916, Dated Jan. 14, 2008.

(56) References Cited

OTHER PUBLICATIONS

B. Kurnalawan, Safari Books Online, "Struts Design and Programming: A Tutorial," Apr. 2005 Retrieved from http://proquest.safaribooksonline.com/0975212818?tocview=true.

DB Solo: The Ultimate Database Tool, 2007, 26 Pages, Retrieved from http://dbsolo.com/.

Azadeh Ahadian, "Understanding Purequery, Part 1: Purequery: IBM's New Paradigm for Writing Java Database Applications," Aug. 2007.

Harsu et al., "A Language Implementation Framework in Java", Object-Oriented Technology, ECOOP'97 Workshop Reader, Lecture Notes in Computer Science, Jun. 9-13, 1997, pp. 141-144, vol. 1357, Jyvaskyla, Finland.

Ballance et al., "The Pan Language-Based Editing System for Integrated Development Environments", SIGSOFT'90, Proceedings of the Fourth ACM SIGSOFT Symposium on Software Development Environments, Dec. 3-5, 1990, pp. 77-93, vol. 15 No. 6, Irvine, California.

* cited by examiner

| Messages | Parameters | Results | Profiling Data | | | |
|---|---|---|---|---|---|---|
| DEPTNO | DEPTNAME | | | MGRNO | ADMRDEPT | LOCATION |
| A00 | SPIFFY COMPUTER SERVICE DIV. | | | 000010 | A00 | |
| B01 | PLANNING | | | 000020 | A00 | |
| C01 | INFORMATION CENTER | | | 000030 | A00 | |
| D01 | DEVELOPMENT CENTER | | | | A00 | |
| D11 | MANUFACTURING SYSTEMS | | | 000060 | D01 | |
| D21 | ADMINISTRATION SYSTEMS | | | 000070 | D01 | |
| E01 | SUPPORT SERVICES | | | 000050 | A00 | |
| E11 | OPERATIONS | | | 000090 | E01 | |
| E21 | SOFTWARE SUPPORT | | | 000100 | E01 | |
| F22 | BRANCH OFFICE F2 | | | | E01 | |
| G22 | BRANCH OFFICE G2 | | | | E01 | |
| H22 | BRANCH OFFICE H2 | | | | E01 | |
| I22 | BRANCH OFFICE I2 | | | | E01 | |
| J22 | BRANCH OFFICE J2 | | | | E01 | |

Javadoc | Declaration | Console | Data Output ✖ |

Status | Action | Object Name |
● Failure | Run | |

| Messages | Parameters | Results | Profiling Data |

Starting run
INSERT INTO SSURANGE.DEPARTMENT
   VALUES ('"B01', 'PLANNING', '000020', 'A00' ")

com.ibm.db2.jcc.c.SqlException: One or more values in the INSERT statement, UPDATE statement, or foreign key update caused by a DELETE statement are not valid because the primary key, unique constr or unique index identified by "1" constrains table "SSURANGE.DEPARTMENT" from having duplicate val for the index key.

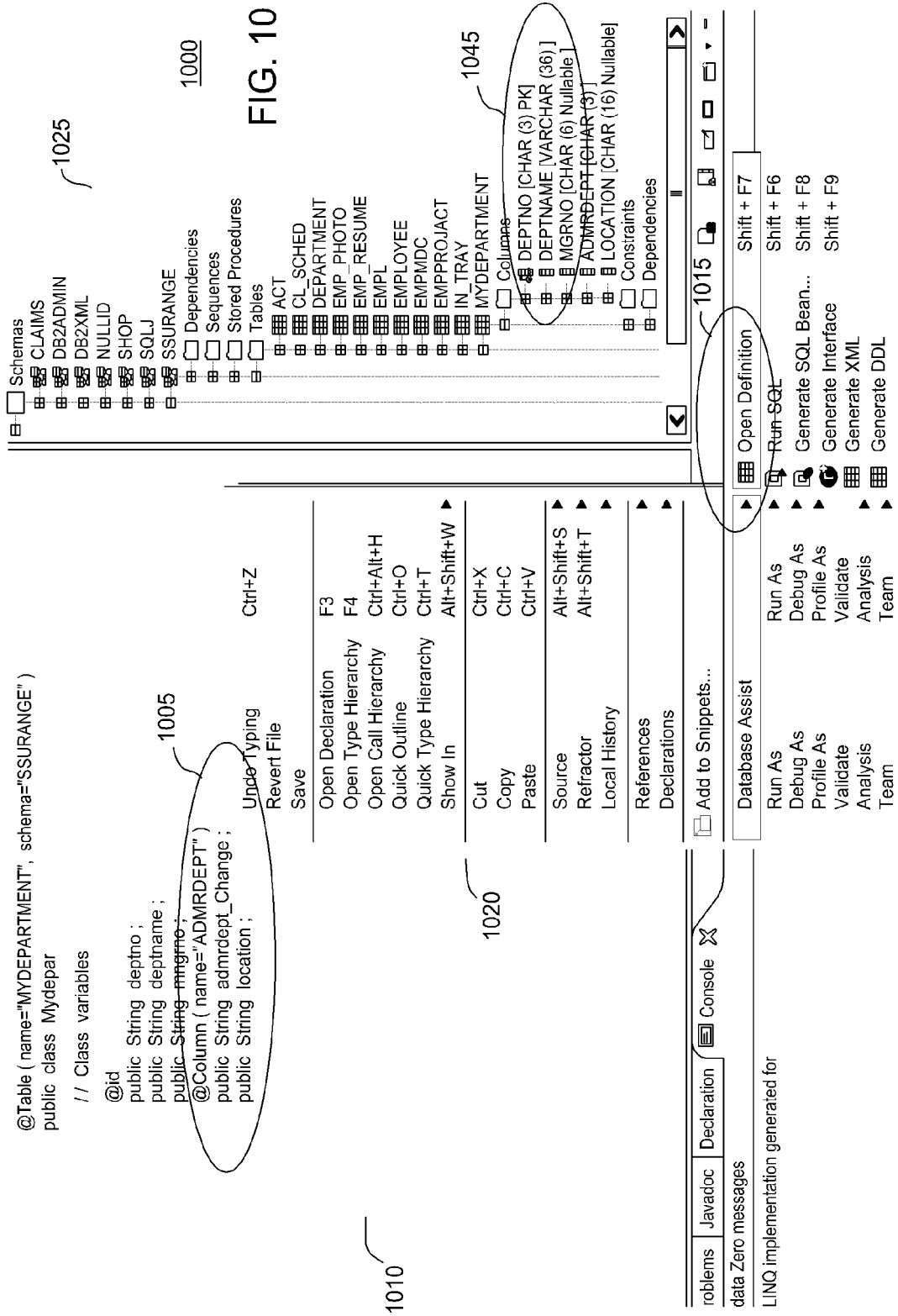

DATABASE CONNECTIVITY AND DATABASE MODEL INTEGRATION WITHIN INTEGRATED DEVELOPMENT ENVIRONMENT TOOL

BACKGROUND OF THE INVENTION

1. Field of the Invention

Embodiments of the invention are related to tools used to develop application software. More specifically, embodiments of the invention provide an intelligent integrated development environment (IDE) tool for database-aware application development.

2. Description of the Related Art

Developing software applications is a complex task, and IDE tools are available to assist computer programmers with the development process. Currently, IDE tools are available to assist programmers developing applications in a variety of programming languages (e.g., Java® .net, C, C++, C#, etc.). These tools are typically configured with features such as auto-indenting, syntax highlighting, type checking, and a variety of other features that assist the development process. An IDE tool may include a text editor that visually displays errors as source code is typed, allowing a developer to correct errors before proceeding with the next line to code. Typically, IDE tools are customized for different programming languages and errors are identified based on the programming language being used by the developer, often determined by a suffix of a project file (e.g., .cpp for a C++ program or .java for a Java® program).

Although very useful, these IDE tools have a variety of limitations. For example, software applications often need to interact with a database. And application source code often includes embedded database statements. The database statements may retrieve data from, or update/insert data into, the database. In the program source code, database statements are usually specified as text strings in a database query language, such as SQL. The following source code fragment illustrates an embedded SQL query using the Java® programming language:

```
public interface get_data {
  // create connection to database
  @select sql= ("select column_A, column_B from database.table");
  // execute sql statement
  // process query results
}
```

Because the query is enclosed within double-quotes, conventional IDE's treat the database statement as a text string, with no restrictions on string content. Thus, none of the features available for assisting developers or for detecting errors in the source code are applied to database statements embedded within application source code. Similarly, when a project is built from the application source code, the compiler ignores the text string and simply includes it in the compiled project. Thus, any errors in the database statement may go undetected until the application is built and executed. And even then, when the program fails to function as intended, identifying the error may be extremely difficult as the IDE does not provide any clues that the embedded database statement is the source of run-time errors.

Generally, the application program is responsible to catch any errors and send the right error messages to help identify the reason for failure. This leaves a burden on the developer to write source code to retrieve and identify the cause of the error. Upon executing the program and identifying what went wrong, the developer now goes back to the program source code to fix the problem. The process is repeated until all of the database statements in the program are perfected.

Additionally, even when database statements are written correctly, the application may not function properly in practice. That is, the database statement "works," but does not update or retrieve records from the database as intended by the developer. Errors like this are notoriously difficult to detect and correct, as they do not manifest themselves until after the project is built and executed. Further, because the IDE ignores database statements—treating them as literal text strings—developers writing database-aware applications have to use different disconnected tools in order to accomplish their task. For example, to test the database statements, the developer may either (i) copy a database statement and paste it into another tool to execute the statement or (ii) build the project and execute it. At runtime, the database statement is executed and the results can be evaluated by the developer. If the results are not what the developer expected, then the developer can revise the query, build the application, and test it again.

These approaches diminish the developer's productivity as switching from one tool to another while in the middle of programming an application is distracting. Further, the latter approach requires the developer to wait for the whole program to be completed and run to see the results of the database statement may increase the time required to code the application, without improving application quality. That is, incrementally fixing each SQL error and running the application (and repeating this process until the whole application is complete) can introduce large delays in the development cycle.

Accordingly, as the foregoing discussion illustrates, there remains a need for an intelligent IDE tool for database-aware application development.

SUMMARY OF THE INVENTION

Embodiments of the invention provide an intelligent integrated development environment (IDE) tool for database-aware application development. For example, embodiments of the invention may provide development assistance to a computer programmer related to database statements embedded within computer program source code.

One embodiment of the invention includes a method of providing database connectivity and database model integration within an integrated development environment (IDE) tool. The method includes displaying a portion of source code in an editing pane of the IDE tool, where the portion of the source code includes at least a text string representing a database statement. The method also includes detecting that a user is interacting with the text string, determining a database to be accessed using the database statement, and establishing a database connection between the IDE tool and the database. The method also includes retrieving a data model associated with the database and providing programming assistance to the user of the IDE tool, based on the interaction of the user with the database statement and the data model.

Another embodiment of the invention includes a computer program product comprising a computer useable storage medium having a computer readable program, where the computer readable program when executed on a computer causes the computer to perform an operation. The operation may generally include displaying a portion of source code in an editing pane of the IDE tool, where the portion of the source code includes at least a text string representing a database statement. The operation also includes detecting that a user is interacting with the text string and determining a database to be accessed using the database statement. The operation also includes establishing a database connection between the IDE tool and the database, retrieving a data model associated with the database, and providing programming assistance to the user of the IDE tool, based on the interaction of the user with the database statement and the data model.

Still another embodiment of the invention includes a system having a processor and a memory containing an integrated development environment (IDE) tool configured to provide database connectivity and database model integration within the IDE tool. The IDE tool may be configured to perform an operation that includes displaying a portion of source code in an editing pane of the IDE tool, where the portion of the source code includes at least a text string representing a database statement. The operation may also include detecting that a user is interacting with the text string, determining a database to be accessed using the database statement, and establishing a database connection between the IDE tool and the database. The operation may further include retrieving a data model associated with the database and providing programming assistance to the user of the IDE tool, based on the interaction of the user with the database statement and the data model.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 7A-7B illustrate results of database query execution presented within an IDE tool, according to one embodiment of the invention.

FIGS. 9A-9C illustrate screenshots of an exemplary IDE tool configured to provide database connectivity and programming assistance to a developer writing a database-aware software application, according to one embodiment of the invention.

FIG. 10 illustrates a screenshot from an exemplary IDE tool configured to provide information related to elements of a data model associated with a database-aware software application, according to one embodiment of the invention.

DETAILED DESCRIPTION OF THE PREFERRED EMBODIMENTS

Figure 1:
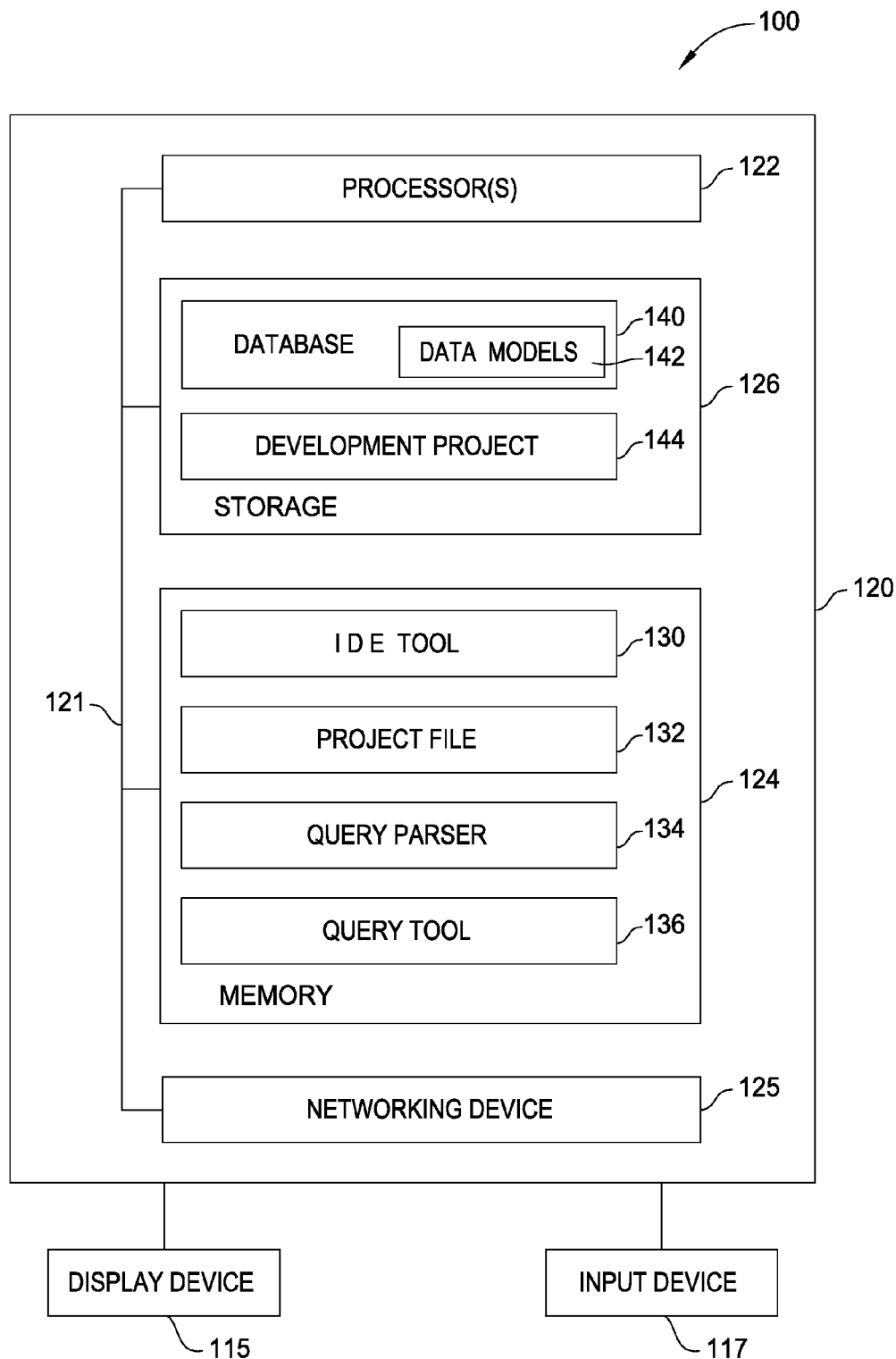
FIG. 1 illustrates an exemplary computing system, according to one embodiment of the invention.

Embodiments of the invention provide seamless integration within an integrated development environment (IDE) tool for displaying database structure and other database information, query editing and execution, and error detection for database statements embedded in program source code. Currently, database statements are routinely ignored by IDE tools, leaving the developer to learn of errors only after the project is built and the resulting application is executed. Embodiments of the invention integrate database connectivity and error detection into the IDE tool, thereby potentially reducing the time required for database-aware application development.

In one embodiment, the IDE tool may be configured to parse program source code as it is entered into a text editor provided by the IDE. Upon detecting that a text string is an embedded database statement, the IDE may pass the query to a query parser configured to evaluate both the syntactic structure and semantic content of the query. For example, semantic validation provides the validation to indicate whether database table names, column names and other such artifacts referred to in an embedded database statement are valid. And syntactic validation provides validation to indicate whether keywords and statement structure are valid, based on a particular query language (e.g., SQL). Any errors identified by the query parser may be returned to the IDE, and displayed to the developer. Thus, embodiments of the invention may increase developer productivity by flagging SQL errors as the developer enters SQL and also by indicating the cause of the errors. This allows the developer to fix the errors in place, without having to wait until the program is built, executed, and errors occur. Further, because the IDE may allow the developer to specify a database to associate with a particular development project, the IDE tool may be configured to connect with the database and provide a variety of development assistance such as statement type-ahead features, type-checking features, and query execution.

In one embodiment, as the IDE tool may be configured to recognize database statements embedded as text-strings within the program source code. Further, the IDE tool may prevent a developer from successfully compiling a project so long as errors are detected in the database statements. This may provide a significant advantage to application development and a boost in productivity since all database statements may be validated during application development. Moreover, by integrating database functionality within the IDE, embodiments of the invention may be used to test database statements embedded in program source code using the same IDE interface used to create the software application. Thus, rather than having to switch between tools when developing a database-aware application, the developer may rely on the single, database-aware IDE.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., writable DVDs, RW-CDs, and hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Additionally, an embodiment of the invention is described herein relative to an IDE tool used to develop a database-aware software application using the Java® programming language that includes embedded SQL statements. One of ordinary skill in the art will readily recognize, however, that embodiments of the invention may be adapted for use with a wide variety of programming languages that allow database statements to be embedded within program source code. Similarly, embodiments of the invention may be adapted for use with other database query languages.

FIG. 1 is a block diagram that illustrates an example view of a computing environment 100, according to one embodiment of the invention. As shown, computing environment 100 includes computer system 120. Computer system 120 is included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Further, although FIG. 1 illustrates a single computer system, those skilled in the art will recognize that embodiments of the invention may be adapted for use on multiple systems configured to communicate over a network. Additionally, those skilled in the art will recognize that the illustration of computer system 120 is simplified to highlight aspects of the present invention and that computing systems and data communication networks typically include a variety of additional elements not shown in FIG. 1.

As shown, computer system 120 includes a processor (or processors) 122, a storage device 126, a networking device 125, and a memory 124, all connected by a bus 121. CPU 122 is a programmable logic device that executes user applications (e.g., an IDE tool 130). Computer system 120 may be connected to a display device 115 and one or more input devices 117. Typically, user input devices 117 include a mouse pointing device and a keyboard, and display device 115 is a CRT monitor or LCD display. The processing activity and hardware resources on computer system 120 may be managed by an operating system (not shown). Well known examples of operating systems include the Windows® operating system, distributions of the Linux® operating system, and IBM's AIX and OS/2® operating systems, among others (Linux is a trademark of Linus Torvalds in the US, other countries, or both). Network device 125 may connect computer system 120 to any kind of data communications network, including both wired and wireless networks.

Storage device 126 stores application programs and data for use by computer system 120. Typical storage devices include hard-disk drives, flash memory devices, optical media, network and virtual storage devices, and the like. As shown, storage device 126 contains a database 140 and a development project 144. Database 140 may store a collection of data records organized according to a data model 142. For example, data model 142 may provide a relational schema of tables, columns, and keys for organizing data records stored in database 140 accessed using SQL database statements. Development project 144 represents a collection of information used to build a software application. For example, development project 144 may include source code files, scripts, etc., along with resources such as fonts, images, build-instructions, and project documentation, etc.

As shown, memory 124 stores a number of software applications, including an IDE tool 130, a query parser 134, and a query tool 136. Also, memory 124 includes a project file 132.

IDE tool 130 provides a programming environment that assists a computer programmer in developing software. IDE tool 130 may include a source code editor, a compiler and/or interpreter, build-automation tools, and a debugger (not shown). Other components provided by IDE tool 130 may include a version control system, a class browser, an object inspector, a class hierarchy diagram generator, etc.

Project file 132 represents a file included in development project 144 that is being edited by a developer using IDE tool 130, e.g., a source code file of a database-aware software application. IDE tool 130 may display the text of the source code to the developer on display device 115 and provide an interface that allows the user to edit project file 132.

Query parser 134 may be configured to evaluate a database statement according to a set of rules for a given query language, e.g., SQL. In one embodiment, IDE tool 130 may interact with query parser 134 and query tool 136 as a developer writes the source code for a database-aware software application. For example, the IDE tool 130 may be configured to detect that certain text-strings embedded in project file 132 are, in fact, database statements. In turn, IDE tool 130 may pass such a database statement to query parser 134, which may evaluate the statement for syntactic and semantic correctness. Any errors in the statement may be returned to the IDE tool 130 and presented to the developer. Additionally, the developer may interact with IDE tool 130 and query tool 136 to execute a database query included in project file 132, to display the results of query execution, and to display elements of the data model 142 using the common interface provided by the IDE tool 130. Examples these scenarios are provided below.

Figure 8:
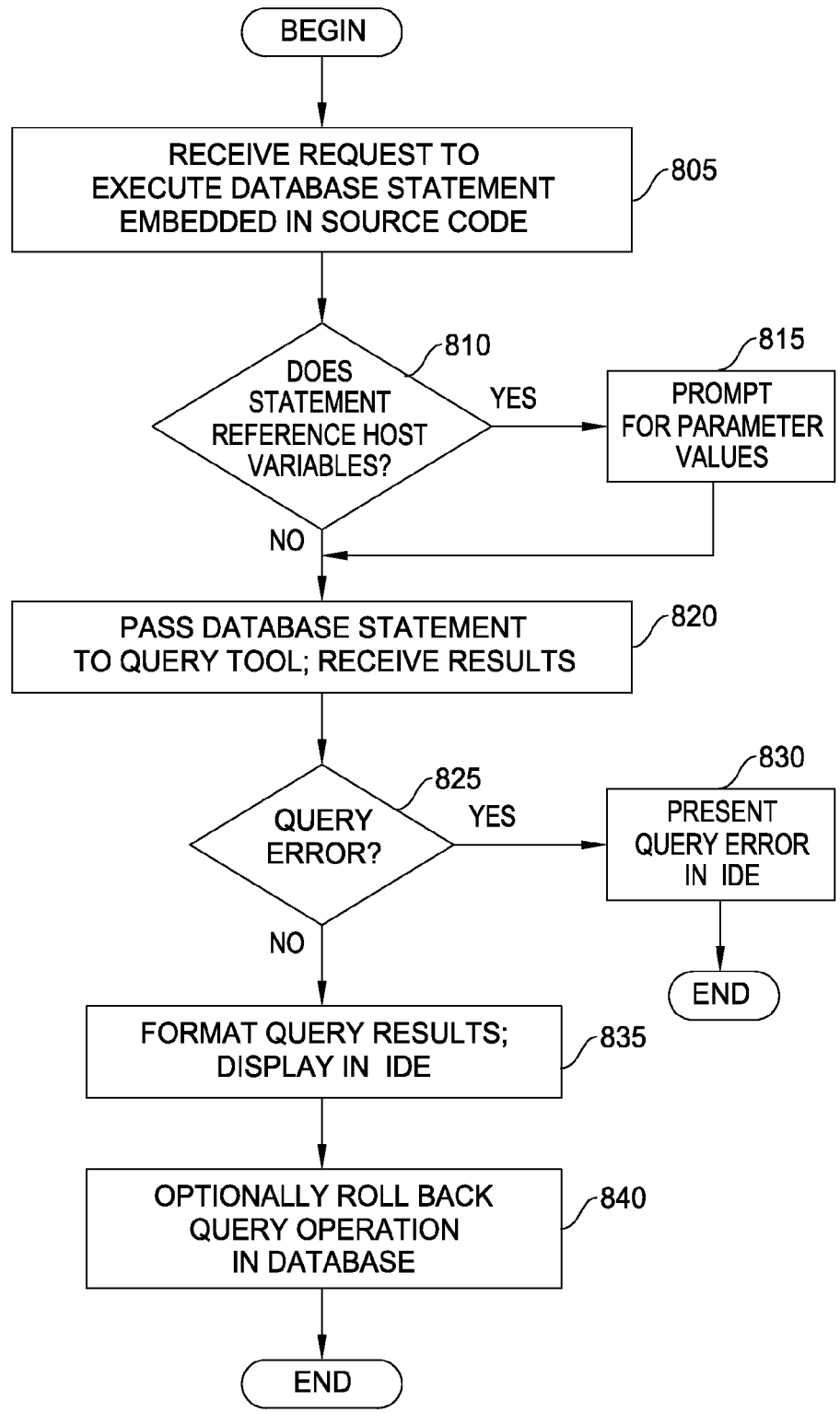
FIG. 8 illustrates a method for an IDE tool to test the operation of a database query embedded in program source code, according to one embodiment of the invention.
Figure 11:
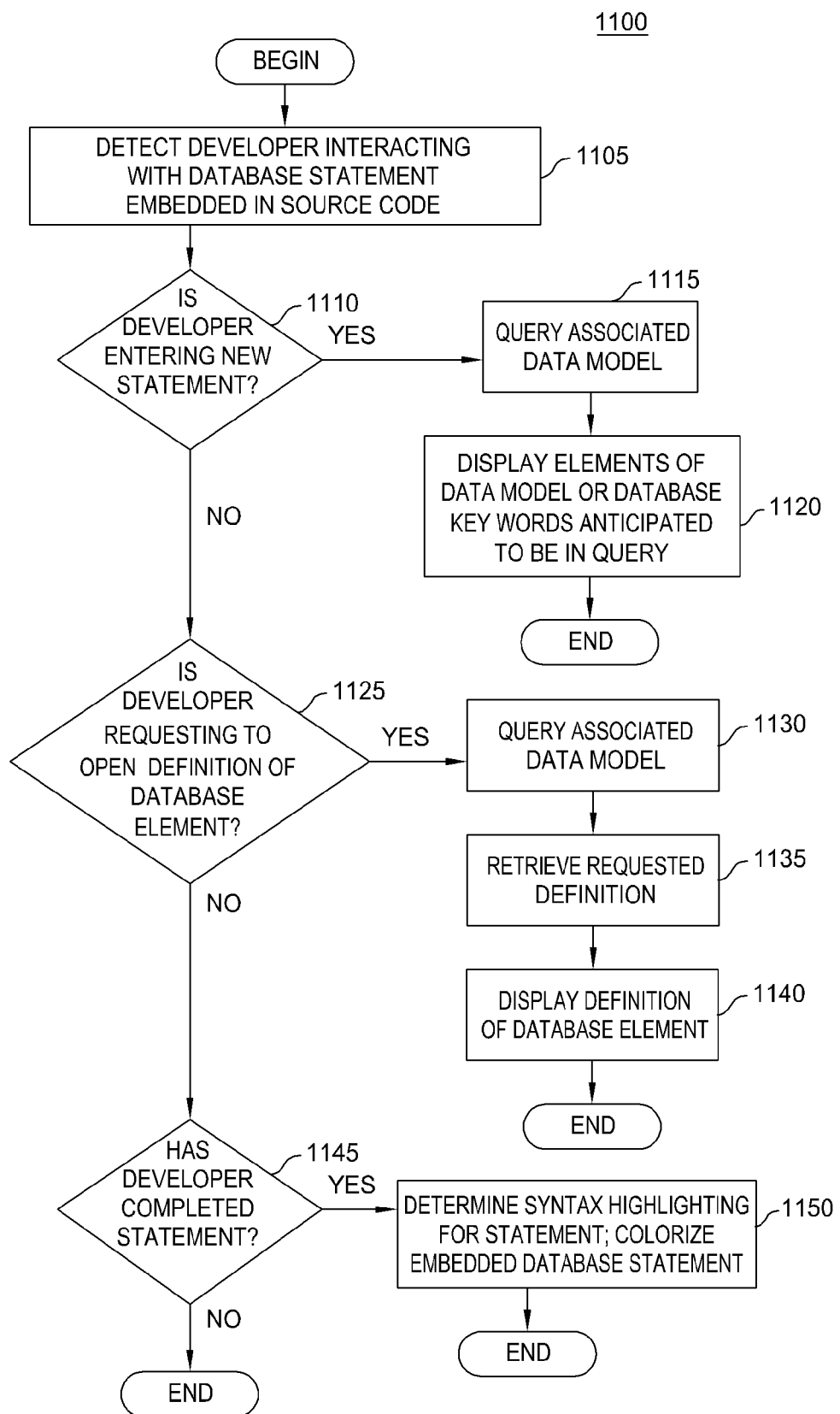
FIG. 11 illustrates a method for an IDE tool to provide database connectivity and programming assistance to a developer writing a database-aware software application, according to one embodiment of the invention.

FIGS. 2-5 illustrate an embodiment of IDE tool 130 configured to evaluate and provide error messages to the developer regarding database statements embedded in program source code. FIGS. 6-8 illustrate an embodiment of IDE tool 130 configured to execute and display query results within the interface provided by IDE tool 130, and FIGS. 9-11 illustrate an embodiment of IDE tool 130 configured to provide database connectivity from within the IDE tool 130.

Figure 2A:
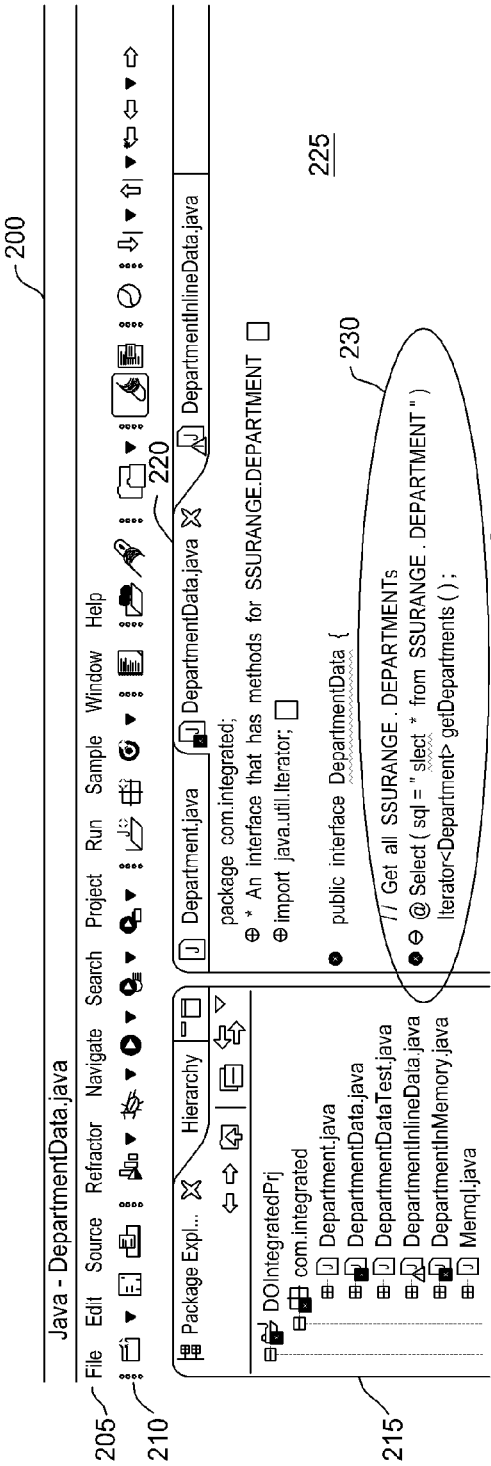
FIGS. 2A-2B illustrate screenshots of an exemplary IDE tool configured to evaluate the syntax of database statements embedded in program source code, according to one embodiment of the invention.
Figure 2B:
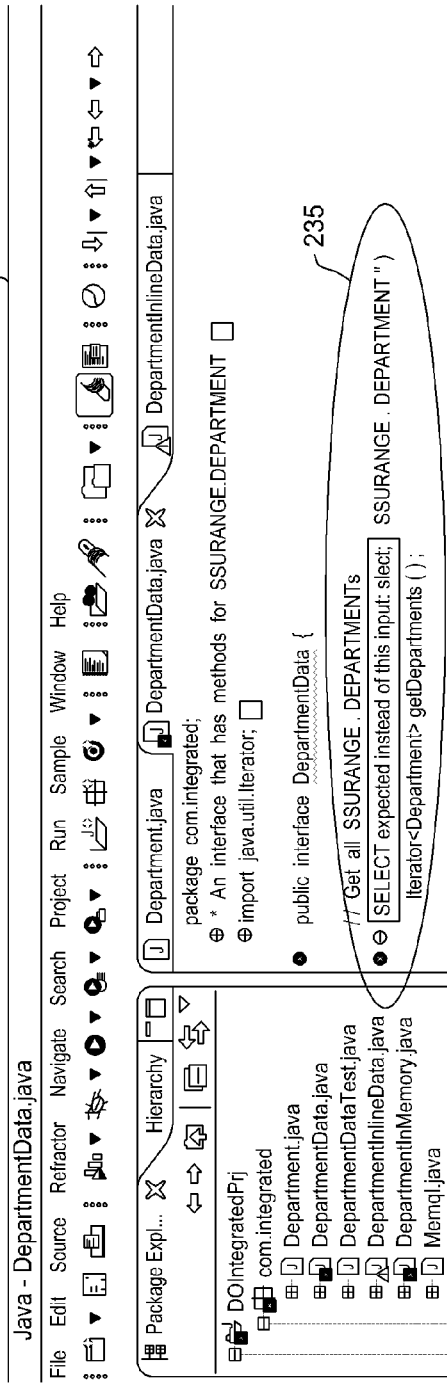

FIGS. 2A and 2B illustrate screenshots of an exemplary IDE tool 130 configured to evaluate a database statement embedded in program source code, according to one embodiment of the invention. Screenshots 200 and 250 illustrate a graphical user interface of an IDE tool 130 being used to develop a database-aware application using the Java® programming language. As shown, screenshot 200 includes a menu bar 205, a button bar 210, a project file hierarchy 215, and an editing pane 220. Menu bar 205 and button bar 210 may be used to access the features and functions provided by IDE tool 130. Project file hierarchy 215 shows a list of source code files included in development project 144 along with an expandable list of methods defined in each source code file. In this example, the item "DepartmentData.java" is selected and editing pane 220 shows the source code 225 of this file. Illustratively, source code 225 includes an embedded database statement (specifically, an SQL query) as part of the highlighted line 230. However, as typed in by the developer, this database query misspells the SQL keyword "select" as "slect." Thus, as typed, this query has a syntax error.

In one embodiment, the IDE tool 130 may detect that line 230 is, in fact a database query, and pass it to a query parser, which may return a message indicating that the syntax of this query is invalid, as typed. Further, the query parser may also return a text-error message describing what caused the query to fail evaluation. As shown in FIG. 2A, the IDE tool 130 highlights the syntax error displaying a jagged underline for the misspelled keyword "selct:"

Further, screenshot 250 of FIG. 2B illustrates a tool-tip message 235 displayed when a mouse cursor is hovered over this syntax error. In this case, the tool-tip message 235 presents the text of the message returned by the query parser: "SELECT expected instead of this input: slect."

Figure 3A:
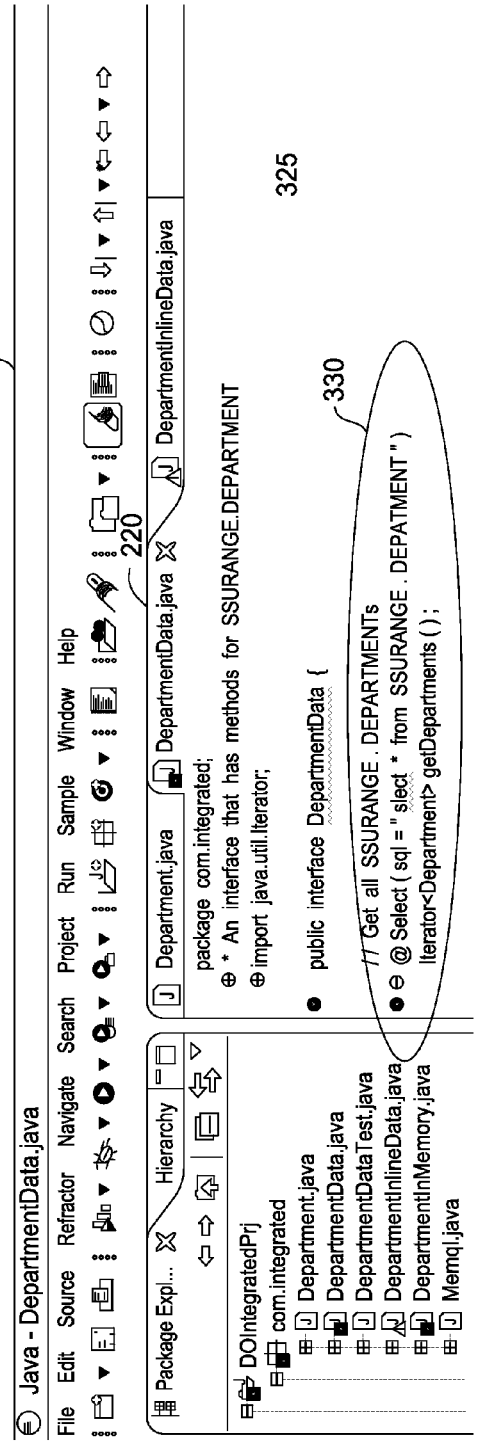
FIGS. 3A-3B illustrate screenshots of an exemplary IDE tool configured to evaluate the semantic content of database statements embedded in program source code, according to one embodiment of the invention.
Figure 3B:
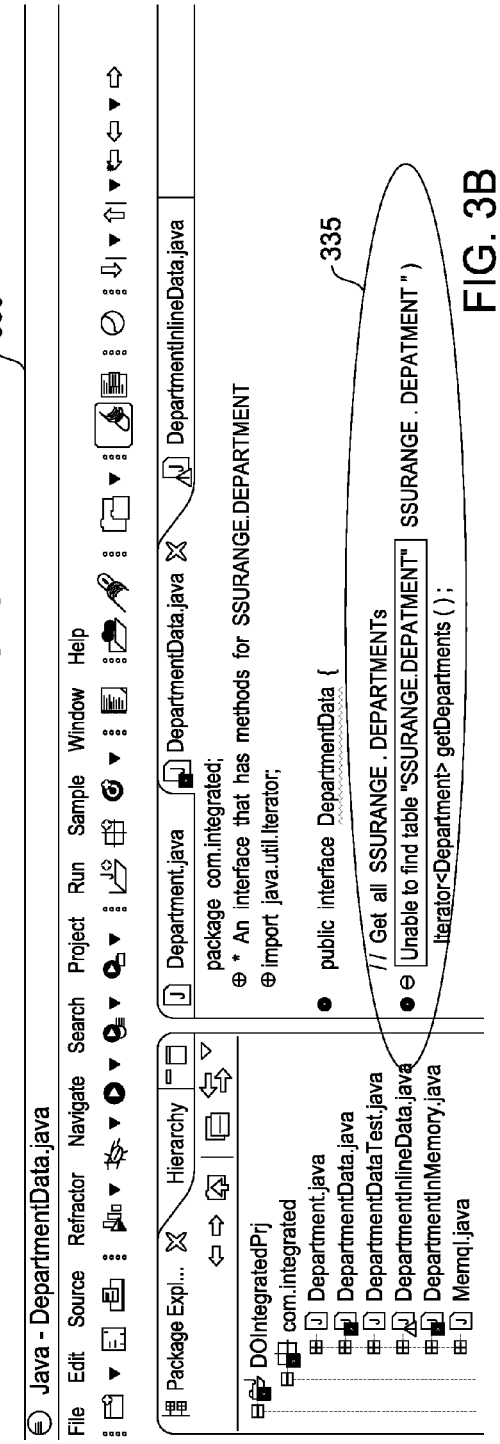

The misspelled keyword illustrated in FIGS. 2A and 2B is an example of a syntax error that may be detected, according to one embodiment of the invention. However, even when a database statement is syntactically correct, the statement may still fail to function as intended due to semantic errors. Accordingly, in addition to detecting syntax errors, the IDE tool 130 may be configured to detect and assist developers in correcting semantic errors within an embedded database statement. FIGS. 3A and 3B illustrate screenshots 300 and 350 of an exemplary IDE tool 130 configured to evaluate the semantic content of a database statements embedded in program source code, according to one embodiment of the invention. Like screenshots 200 and 250, the item "DepartmentData.java" is selected and editing pane 220 shows the source code 325 of this file. Illustratively, source code 225 includes an embedded database statement (specifically, an SQL query) as part of the highlighted line 330. However, as typed in by the developer, this database query misspells a reference to a database table "SSURANGE.DEPATMENT." Because this is a valid name for a database table—even if the database being queried has no table by this name—this query is syntactically valid.

Additionally, the IDE tool 130 may be configured to recommend an appropriate correction for a detected error. In one embodiment, the developer may accept the recommendation and allow the IDE tool 130 to edit the database statement directly. For example, for the syntax error shown in FIG. 2A, the tool tip response could provide a suggested correction of "Select" and allow the user to cause the IDE tool 130 to enter the correction. Quick fixes such as this may be provided for both semantic errors (e.g., errors in table or column names) and syntactic errors (e.g., errors in database keywords). Thus, the IDE tool 130 may be configured to indicate both the presence of syntax error, as well as provide the developer with helpful messages and assistance in correcting errors in database statements.

In one embodiment, the IDE tool 130 may detect that line 330 is, in fact, a database query, and pass it to a query parser, which may return a message indicating that the query is invalid, as typed. Further, the query parser may also return a text-error message describing what caused the query to fail evaluation. As shown in FIG. 3A, the IDE tool 130 highlights the semantic error displaying a jagged underline for the incorrect table name.

Further, screenshot 350 of FIG. 3B illustrates a tool-tip message 335 displayed when a mouse cursor is hovered over this semantic error. In this case, the error message presents the text of the message returned by the query parser: "Unable to find table "SSURANGE.DEPATMENT." Thus, the IDE tool 130 may be configured to indicate both the presence of error, as well as provide helpful messages to assist the developer in correcting the error.

Figure 4:
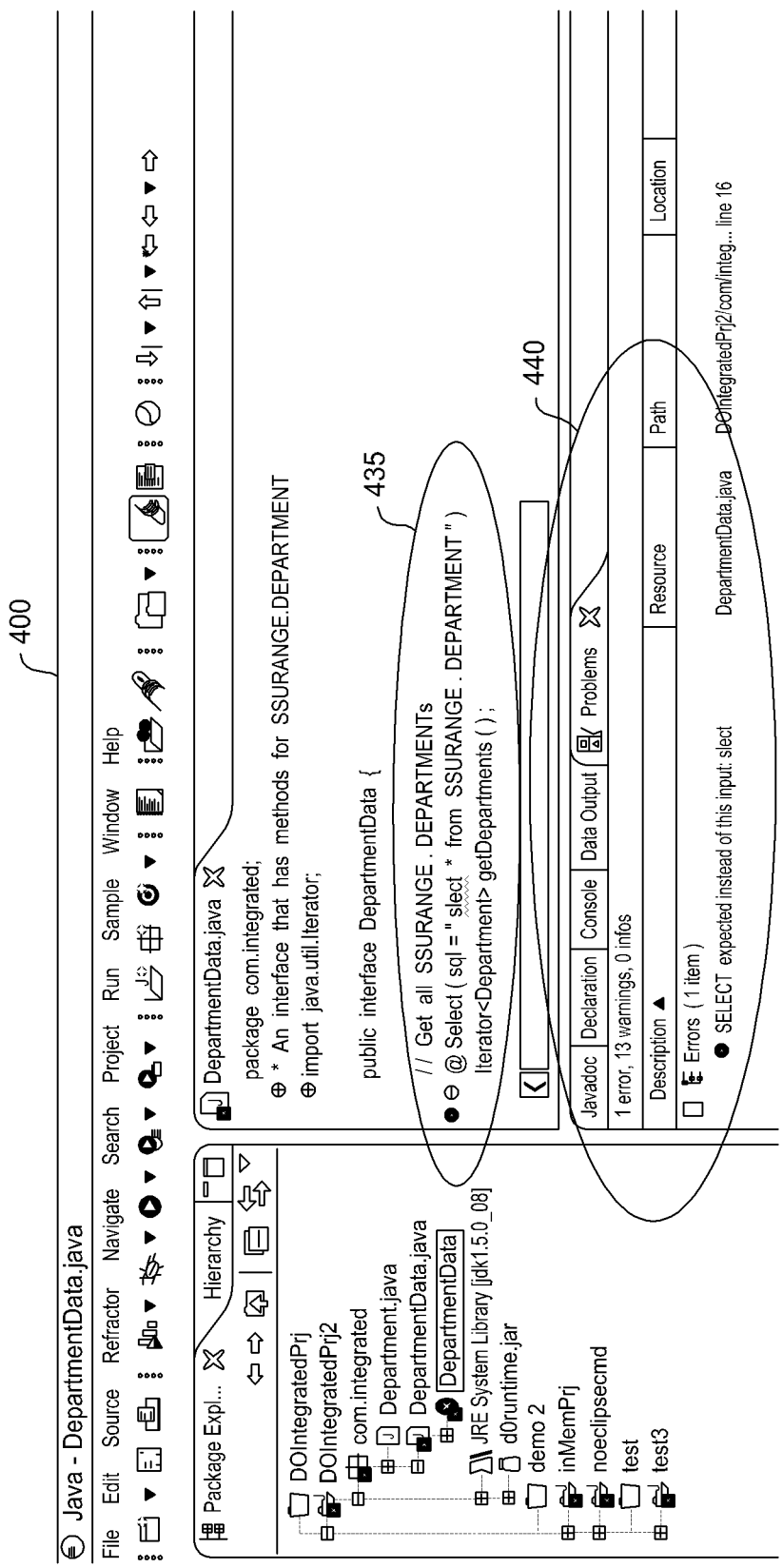
FIG. 4 illustrate a screenshot of an exemplary IDE tool configured to halt a project build process after finding an error in a database statement embedded in program source code, according to one embodiment of the invention.

FIG. 4 illustrates a screenshot 400 of an exemplary IDE tool 130 configured to halt a project build process after finding an error in a database statement embedded in program source code, according to one embodiment of the invention. In this example, the developer has selected to build the project that includes the "DepartmentData.java" source code file without correcting the syntax error present in embedded database statement 435. Because the IDE tool 130 may detect errors in database statements (previously ignored during the build process), in one embodiment, the IDE tool 130 may also be configured to prevent a successful build of a project where an embedded database query cannot be validated by a query parser. Thus, in this example, an error pane 440 provides an indication of the error identified by the build process, allowing the developer to correct the syntax error before this project can successfully be built.

Figure 5:
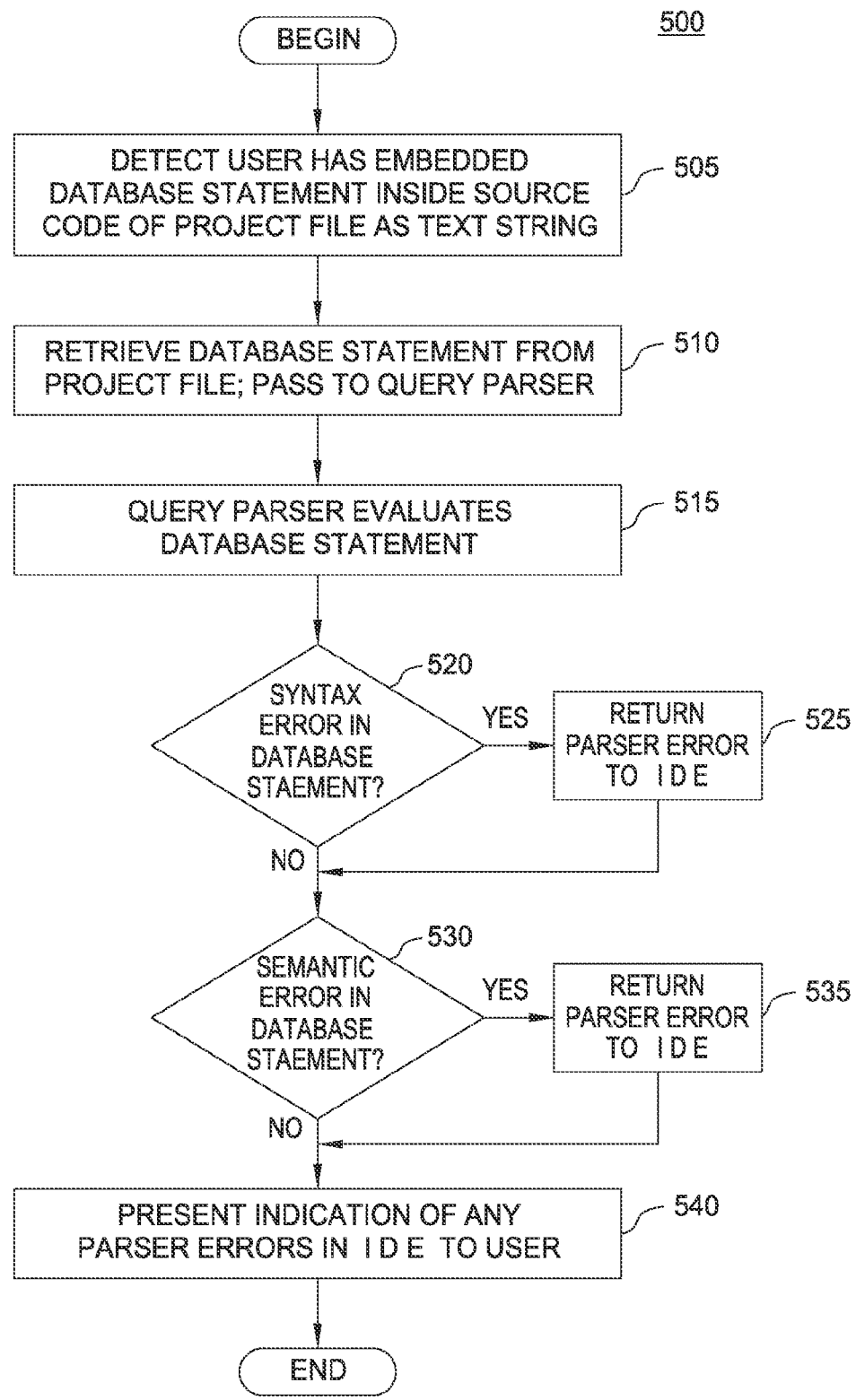
FIG. 5 illustrates a method for an IDE tool to identify errors in a database statement embedded in program source code, according to one embodiment of the invention.
Figure 6:
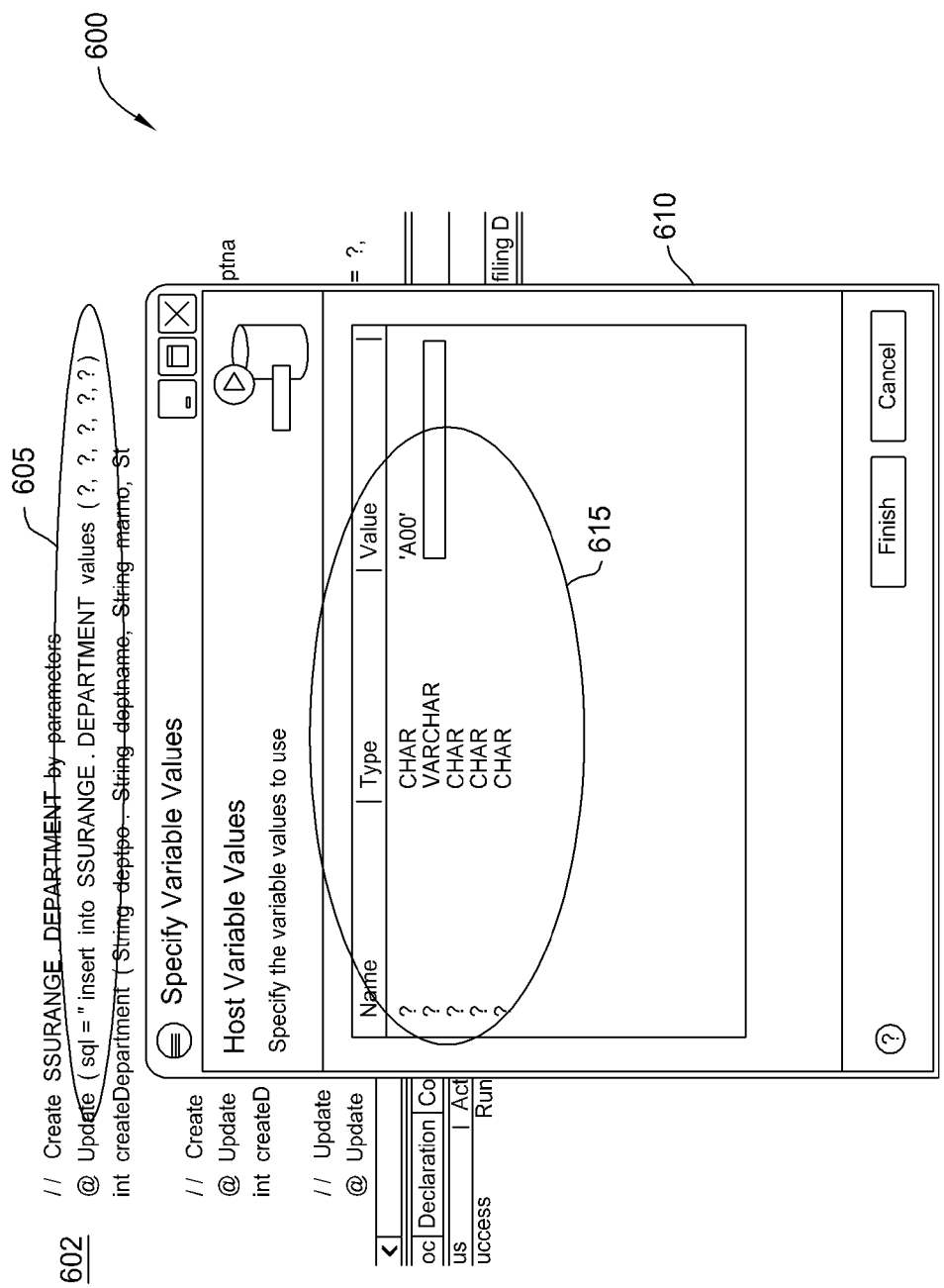
FIG. 6 illustrates a screenshot from an exemplary IDE tool configured to execute a database statement embedded in program source code, according to one embodiment of the invention.

FIG. 5 illustrates a method 500 for an IDE tool 130 to identify errors in a database statement embedded in program source code, according to one embodiment of the invention. As shown, method 500 begins at step 505 where the IDE may detect that a developer has embedded a database statement within the source code of a project file. At step 510, the IDE may retrieve the database statement from the source code and pass it to a query parser for evaluation. At step 515 the query parser may evaluate the database statement, based on the syntax requirements of the particular type of query and on the semantic content of an associated database. At step 520, if a syntax error is found within the database statement, then at step 525, an error message may be returned to the IDE tool 130. And at step 530, if a semantic error is found within the database statement, then at step 535, an error message may be returned to the IDE tool 130. At step 540, the IDE tool 130 may display an indication of any error messages found in the database statement using a variety of user interface elements (e.g., the jagged underlines and tool-tip features shown in FIGS. 2 and 3.

As stated, developers may frequently embed text strings representing database statements within the source code of a computer program. In one embodiment, an IDE tool 130 may integrate testing the database statements with application development by providing seamless integration of a database query tool within the IDE tool 130. For example, in one embodiment, the developer may simply right-click on a database statement displayed in an editing pane and select a menu item to execute the statement. The IDE tool 130 may also display a user interface dialog allowing the developer to select various options to run the database statement or prompt the developer for values for input and output variables supplied to the query tool. Further, the IDE tool 130 may store the values provided for each statement, providing the developer with a quick way to re-perform the database operation represented by the embedded database statement in the future. This may be particularity useful for database statements that include a large number of parameters.

FIG. 6 illustrates a screenshot 600 from an exemplary IDE tool 130 configured to execute a database query embedded in program source code, according to one embodiment of the invention. As shown, screenshot 600 includes an editing pane 602 and a dialog box 610. Illustratively, editing pane 602 contains a fragment of program source code. Additionally, a highlighted line 605 of this source code fragment contains an embedded database statement. In this case, the SQL statement is: "insert into SSURANGE.DEPARTMENT values (?, ?, ?, ?, ?)". When performed, this SQL statement creates a new database record in the "DEPARTMENT" table of a database named "SSURANGE," where the new record contains the values supplied for the five question-marks ("?"). The developer may supply values for the "?" fields of the insert statement to use in testing this query using dialog box 610. In one embodiment, the test values may be entered into table 615. Further, the IDE tool 130 may be configured to access a data model corresponding to the database being accessed. This information may be used to assist the developer in supposing test values for query execution. For example, as shown, dialog box 610 includes a type column providing the developer with an indication of the data type that should be entered for each of the "?" fields in this database statement.

In one embodiment, the developer may also specify options regarding query execution. For example, the IDE tool 130 may provide the developer with an option to commit or rollback an insert or update transaction after the database statement is executed. This may be useful where a new application is developed for an existing "live" database. By rolling back any database operations performed during application development, embedded database statements may be fully tested without permanently modifying data records stored in the "live" database. Another option includes allowing the developer to limit the number of rows retrieved from the database for a test query. This may be useful if a developer needs to review only a small number of rows returned from query execution to evaluate an embedded database query.

In one embodiment, the results of executing the embedded database statement are presented in an output pane provided by the IDE tool 130. The query output pane may include tabs that may be selected to various aspects of the query results. For example, FIGS. 7A-7B illustrate an IDE interface 750 used to present the developer with results of database query execution, according to one embodiment of the invention. As shown, FIG. 7A illustrates a collection of data records retrieved from a database. Specifically, a results tab 715 of interface 750 is selected and a table 720 shows data records retrieved for a database query embedded in application source code. Illustratively, the query results shown in table 720 correspond to the SQL "select" statement shown in FIGS. 2 and 3.

FIG. 7B illustrates another example display of interface 750 where a developer has provided values for the "?" fields of the insert query shown in FIG. 6. In this example, a message tab 710 is selected and message pane 755 shows any messages generated by a database query tool during query execution. Assume for this example that the developer has provided an invalid value for one of the query fields. In response, when the embedded database statement is executed, the resulting error message is presented in message pane 755. At this point, the developer may select the parameters tab 720, modify the parameters supplied to the database query tool, and perform additional test-runs of the query. Typically, the developer may be expected to modify a database statement several times before it is finalized.

Moreover, a typical database-aware application is likely to include several database statements. For example, at a minimum, a database-aware application is likely to include statements to create records, retrieve records, update records, and delete records from a given database. Thus, the developer may use an embodiment of the invention to perfect each separate database statement. Accordingly, embodiments of the invention provide productivity enhancements for application developers as they write code that accesses an external database (e.g., as the developer composes a database statement).

FIG. 8 illustrates a method 800 for an IDE tool 130 to test the execution of a database query embedded in program source code, according to one embodiment of the invention. As shown, method 800 begins at step 805 where an IDE tool 130 receives a request to execute a database statement embedded in program source code. For example, a developer may right click the text of a database statement, and in response, the IDE tool 130 may present the developer with a context-sensitive menu that includes a menu item allowing the developer to execute the statement. Selecting the menu item may cause the IDE tool 130 to display a user interface allowing the developer to supply any information needed to run the query. In one embodiment, if the developer has previously executed the database statement, then the developer may be presented with the parameter values selected the last time the query was executed. On the other hand, if the database statement has not been tested within the IDE tool 130, then the developer may enter values for all input and output parameters along with values for any host variables.

At step 810, the IDE tool 130 may determine whether the statement specified at step 805 references any host variables. If so, then at step 815, the IDE tool 130 may present a dialog, or other user interface construct, allowing the developer to specify values to use in performing the database operation. At step 820, the database statement (and any supplied values or parameters) are passed to a database query tool which executes the database statement. After executing the database statement, the results may be passed back to the IDE tool 130.

At step 825, if an error occurred while the query tool executed the database statement, then at step 830, error messages may be presented to the developer in the user interface provided by the IDE. For example, FIG. 7B illustrates message tab 710 of a query output pane 755 being used to present the content of an error generated by executing a database statement caused by values supplied by the developer. Otherwise, if the query tool successfully executed the database statement, then at step 835, the query results may be formatted for display in the user interface provided by the IDE. For example, in the case of a data retrieval query, the records that satisfied any query conditions may be presented to the developer, such as the query results shown in table 720 of FIG. 7A. At this step, the query results are displayed to the developer in an interface provided by the IDE tool 130. At step 840, the query tool optionally may roll back the query operation in the database.

In one embodiment, the IDE tool 130 may be configured to provide a variety of code assistance features that an application developer may use while writing a database-aware software application. For example, code assist features may provide valid options for a database statement as the developer types the statement in an editing pane of the IDE tool 130, based on both the syntax and context of the of the particular query language being used. Features such as database statement completion assist the developer by providing valid selections for database statements, as they are typed. Further, features such as syntax colorization may simplify the readability and understandability of complex database operations, reducing errors. Similarly, as the IDE tool 130 may establish a connection with the database, the IDE tool 130 may be may be able to import and display portions of a data model of a database in response to developer requests for information related to a data model. For example, the IDE tool 130 may be configured to present elements of a database schema (e.g., tables, columns, keys, etc.) that underlie a given database statement embedded in program source code. All of the above features may increase developer productivity and assist the developer in building complex yet less error-prone applications.

Figures 9A, 9B:
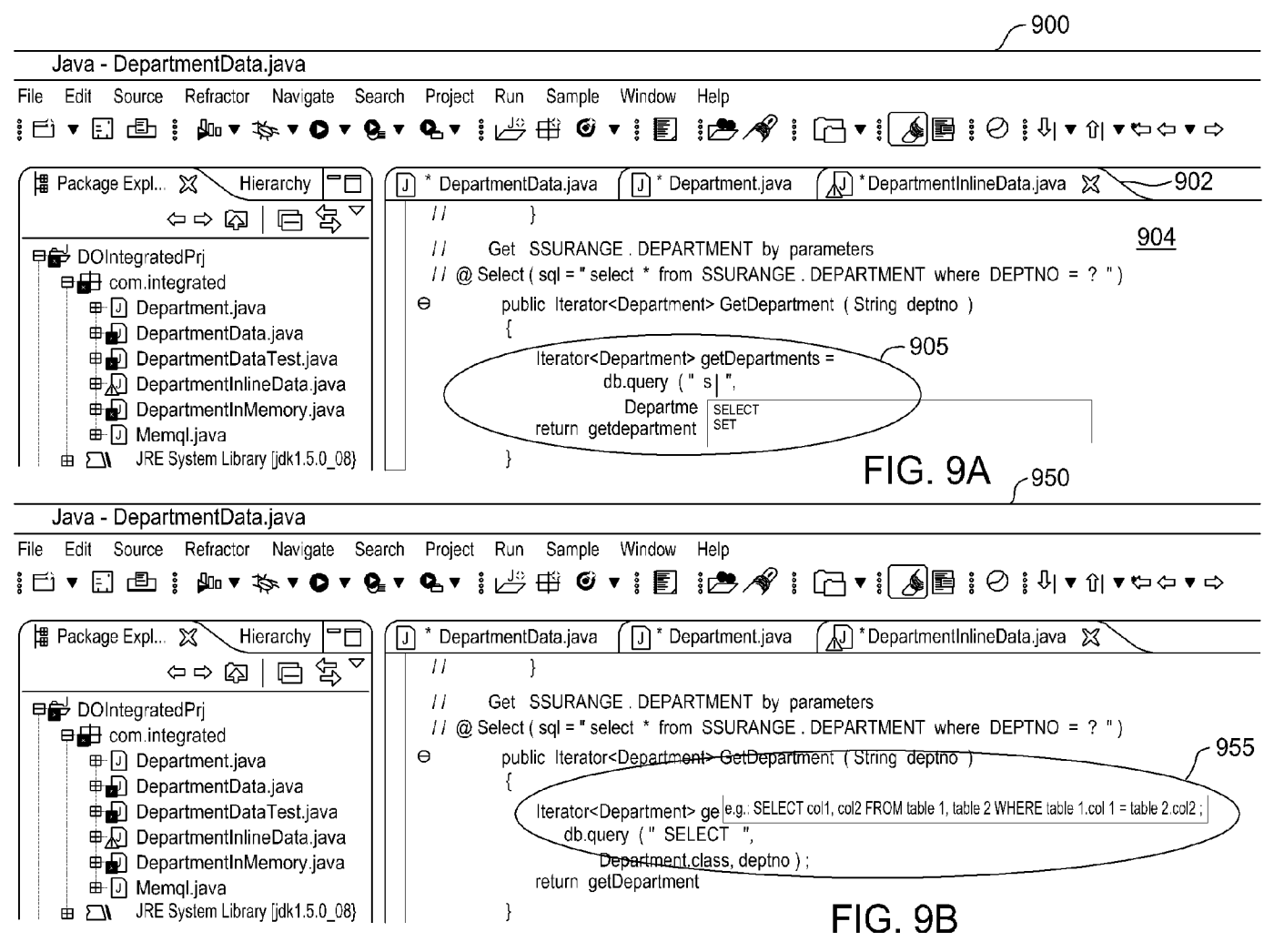
Figure 9C:
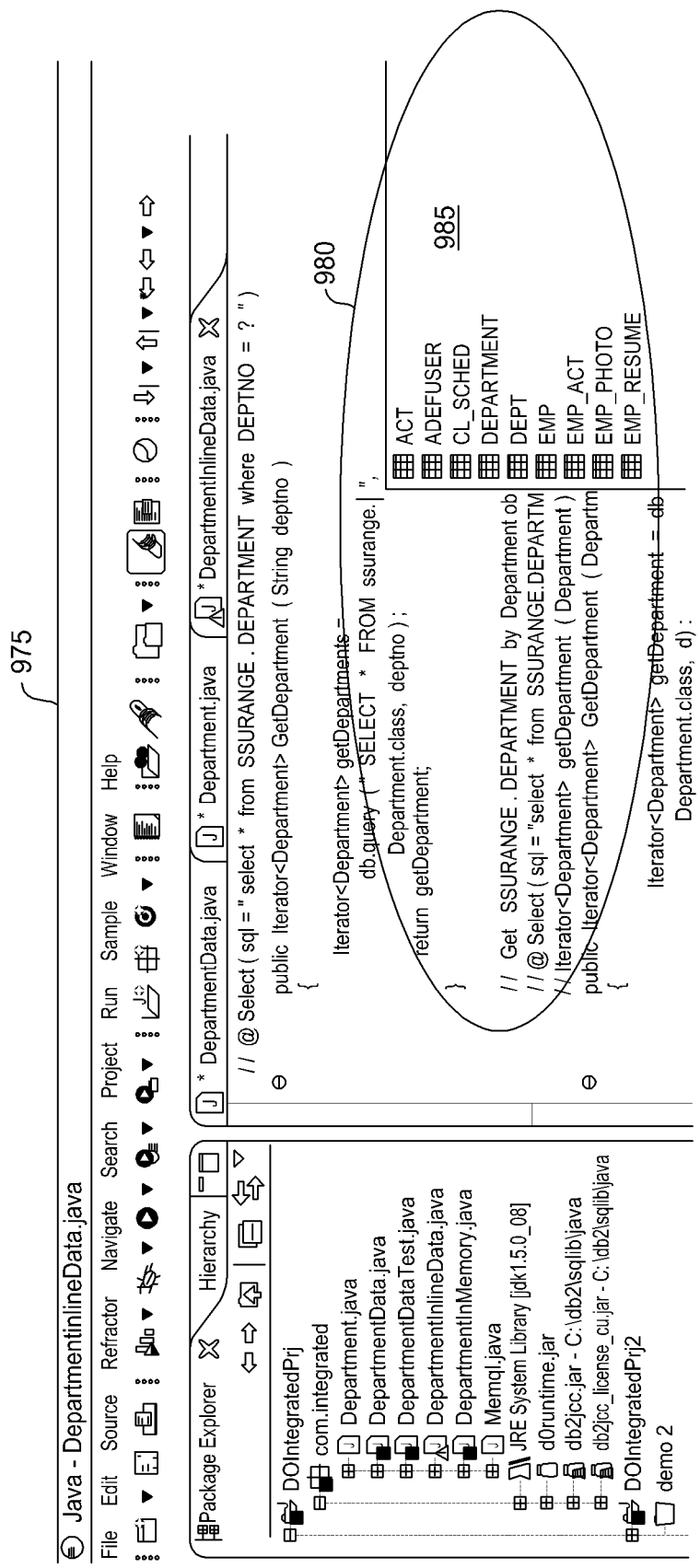

FIGS. 9A-9C illustrate screenshots of an exemplary IDE tool 130 configured to provide database connectivity and programming assistance to a developer writing a database-aware software application, according to one embodiment of the invention. Screenshots 900, 950 and 975 illustrate a graphical user interface of an IDE tool 130 being used to develop a database-aware application using the Java® programming language. As shown, the project element "DepartmentData.java" is selected and editing pane 902 shows the source code 904 of this project element. Illustratively, source code 904 includes an embedded database statement (specifically, an SQL query) as part of the highlighted line 905 currently being entered by a developer. Specifically, the developer has entered the "s" character within a pair of double quotes following a statement "db.query," which signifies that the text string within the double quotes is a database statement. In one embodiment, the IDE tool 130 may detect that the developer is entering a database statement and provide code assistance, based on the keywords of the query language and schema of a database associated with the development project. For example, FIG. 9A includes a text-prediction list 910. Based on the "s" character, and the keywords of the SQL language, the IDE tool 130 has determined that the developer may be in the process of entering a "select" or a "set" statement.

Further, screenshot 950 of FIG. 9B illustrates a tool-tip message 955 displayed when a mouse cursor is hovered over the database statement being entered. In this case, message 955 presents the general structure of a select statement: "SELECT col1, col2, FROM table1, table2 WHERE . . . . " In addition to the keyword matching shown in FIG. 9A, in one embodiment, the IDE tool 130 may present valid selections for elements of a data model to include in a database statement being entered. For example, screenshot 975 of FIG. 9C illustrates a prediction list 985 for a database statement being entered. In this case, the developer has continued entering the database statement first shown in FIG. 9A to a point where it reads "Select * FROM ssurange._." That is, the developer has specified an embedded database statement that will retrieve all columns from a table named "ssurange." However, the developer has not yet entered the name of the table in the database statement. In response, the IDE tool 130 has determined a list of valid table names based on the data model underlying the "ssurange" database and displayed them in prediction list 985. As the developer continues entering the database statement, additional elements of the "ssurange" database may be displayed in a prediction list. For example, once a table is selected, the IDE tool 130 may display a list of columns defined for the selected table.

In addition to providing type-ahead features for a database statement embedded in program source code, the IDE tool 130 may be configured to provide a developer with information regarding a database statement embedded in program source code. In one embodiment, the developer may open a declaration for a table, column or schema name or host variable inside the SQL statement. The IDE may display various properties such as table columns, number of tables in a schema or column properties. In the case of a host variable, the definition of the variable may be displayed. For example, FIG. 10 illustrates a screenshot 1000 from an exemplary IDE tool 130 configured to provide information related to elements of a data model associated with a database-aware software application, according to one embodiment of the invention. As shown, screenshot 1000 includes an editing pane 1010, and element pane 1025. Editing pane 1010 displays source code lines 1005 that include references to a database associated with the database-aware application being developed. Specifically, lines 1005 reference an "ADMRDEPT" column of a table named "MYDEPARTMENT." Assume for this example that the developer has right clicked on lines 1005 and that the IDE tool 130 has displayed a context-sensitive menu 1020 that includes an "open definition" selection choice 1015.

In response, element pane 1025 displays information related to the structure of the database referenced by lines 1005. Specifically, the definition of the "DEPTNAME" column of the "MYDEPARTMENT" table is shown at 1045. Other elements of the "SSURANGE" database (e.g., table names, and columns of the "MYDEPARTMENT" database are also shown in 1025. As this example illustrates, embodiments of the invention may allow a developer to efficiently determine the structure and definitions underlying database elements referenced in program source code. Further, the IDE tool 130 may provide this functionality directly from database statements embedded as text strings in the source code of a database-aware application. Thus, in one embodiment, a developer may right-click on the text of a database statement, and in response, the IDE tool 130 may identify the text and open a definition of the database element in a pane like pane 1025. For example, a user may click on the name of a column or table included in a database query and be presented with a definition of the selected database element.

FIG. 11 illustrates a method 1100 for an IDE tool 130 to provide database connectivity and programming assistance to a developer writing a database-aware software application, according to one embodiment of the invention. As shown, method 1100 beings at step 1105 where an IDE tool 130 detects that a developer is interacting with database statements embedded within program source code. At step 1110, the IDE tool 130 may determine whether the developer is entering a new database statement. If so, at step 1115, the IDE tool 130 may identify the data model associated with the database statement. And at step 1120, the IDE tool 130 may display elements of the data model predicted to be part of the database statement, based on the current input. For example, FIGS. 9A and 9C illustrate prediction lists that display elements of database content and query statement syntax.

Alternatively, at step 1125, the IDE tool 130 may determine whether the developer is requesting to open a definition of a database element. If so, at step 1130, the IDE tool 130 may identify the data model associated with the database statement. At step 1135, the IDE may retrieve the definition for the database element specified at step 1125. And at step 1140, the definition retrieved from the database may be displayed to the developer using the common interface provided by the IDE tool 130. For example, FIG. 10 illustrates a hierarchical view of database elements, including the definition of a column from a particular table, as requested by a developer.

Alternatively, at step 1145, the IDE tool 130 may determine whether the developer has completed entering the database statement. If so, at step 1150, the IDE tool 130 may identify the database statement and add any syntax highlighting. For example, statement keywords may be highlighted within the text string to distinguish these elements of the statement from others. Further, as described above, the IDE tool 130 may also be configured to pass the text string of the database statement to a query parser and return any errors introduced by the developer.

Advantageously, embodiments of the invention provide seamless integration within an integrated development environment (IDE) tool for displaying database structure and other database information, query editing and execution, and error detection for database statements embedded in program source code. Currently, database statements are routinely ignored by IDE tools, leaving the developer to learn of errors only after the project is built and the resulting application is executed. By integrating database functionality within the IDE, embodiments of the invention may be used to test database statements embedded in program source code using the same IDE interface used to create the software application. Thus, rather than having to switch between tools when developing a database-aware application, the developer may rely on the single, database-aware IDE.

While the foregoing is directed to embodiments of the present invention, other and further embodiments of the invention may be devised without departing from the basic scope thereof, and the scope thereof is determined by the claims that follow.

What is claimed is:

1. A method of providing database connectivity within an integrated development environment (IDE) tool, the method comprising:
   displaying a portion of source code in an editing pane of the IDE tool, wherein the portion of the source code includes at least a text string representing a database statement;
   determining a database to be accessed using the database statement;
   establishing a database connection between the IDE tool and the database;
   retrieving a data model associated with the database;
   upon determining the database statement includes one or more host variables passing data to the database, prompting for a value for each host variable;
   evaluating, based on the data model, the database statement to identify any errors in the database statement, wherein evaluating the database statement includes executing the database statement and providing an option to commit or rollback one or more database changes made as a result of executing the database statement;
   providing programming assistance based on the database statement and the data model, including providing an indication of any errors identified by the evaluation; and
   storing, by the IDE tool, the value provided for each host variable to allow the database statement to be re-executed from within the IDE tool without again prompting for values for the host variables.

2. The method of claim 1, wherein the data model comprises a relational schema specifying an organization of tables, columns, and keys defined for the database associated with the data model.

3. The method of claim 1, further comprising:
   highlighting elements of the text string to distinguish different portions of the database statement from one another.

4. The method of claim 1, wherein the text string represents a partially completed database statement, and wherein providing the programming assistance comprises:
   predicting, based on the text string, one or more completed elements of the database statement; and
   displaying a list of the one or more completed elements in the editing pane.

5. The method of claim 4, wherein at least one of the one or more completed elements is a keyword of a database query language in which the database statement is being composed.

6. The method of claim 4, wherein at least one of the one or more completed elements specifies a name of an element of the data model.

7. The method of claim 1, wherein the IDE tool provides a programming environment used to develop a database-aware application, and wherein the IDE tool includes at least a graphical text editor and a compiler.

8. A computer program product comprising a non-transitory computer readable storage medium having a computer readable program, wherein the computer readable program when executed on a computer causes the computer to perform an operation comprising:
   displaying a portion of source code in an editing pane of the IDE tool, wherein the portion of the source code includes at least a text string representing a database statement;
   determining a database to be accessed using the database statement;
   establishing a database connection between the IDE tool and the database;

retrieving a data model associated with the database;
upon determining the database statement includes one or more host variables passing data to the database, prompting for a value for each host variable;
evaluating, based on the data model, the database statement to identify any errors in the database statement, wherein evaluating the database statement includes executing the database statement and providing an option to commit or rollback one or more database changes made as a result of executing the database statement; and
providing programming assistance based on the database statement and the data model, including providing an indication of any errors identified by the evaluation; and
storing, by the IDE tool, the value provided for each host variable to allow the database statement to be re-executed from within the IDE tool without again prompting for values for the host variables.

9. The computer readable storage medium of claim 8, wherein the data model comprises a relational schema specifying an organization of tables, columns, and keys defined for the database associated with the data model.

10. The computer readable storage medium of claim 8, wherein the operation further comprises:
highlighting elements of the text string to distinguish different portions of the database statement from one another.

11. The computer readable storage medium of claim 8, wherein the text string represents a partially completed database statement, and wherein providing the programming assistance comprises:
predicting, based on the text string, one or more completed elements of the database statement; and
displaying a list of the one or more completed elements in the editing pane.

12. The computer readable storage medium of claim 11, wherein at least one of the one or more completed elements is a keyword of a database query language in which the database statement is being composed.

13. The computer readable storage medium of claim 11, wherein at least one of the one or more completed elements specifies a name of an element of the data model.

14. The computer readable storage medium of claim 8, wherein the IDE tool provides a programming environment used to develop a database-aware application, and wherein the IDE tool includes at least a graphical text editor and a compiler.

15. A system, comprising:
a processor; and
a memory containing an integrated development environment (IDE) tool configured to provide database connectivity within the IDE tool by performing an operation, comprising:
displaying a portion of source code in an editing pane of the IDE tool, wherein the portion of the source code includes at least a text string representing a database statement,
determining a database to be accessed using the database statement,
establishing a database connection between the IDE tool and the database,
retrieving a data model associated with the database,
upon determining the database statement includes one or more host variables passing data to the database, prompting for a value for each host variable,
evaluating, based on the data model, the database statement to identify any errors in the database statement, wherein evaluating the database statement includes executing the database statement and providing an option to commit or rollback one or more database changes made as a result of executing the database statement,
providing programming assistance based on the database statement and the data model, including providing an indication of any errors by the evaluation, and
storing, by the IDE tool, the value provided for each host variable to allow the database statement to be re-executed from within the IDE tool without again prompting for values for the host variables.

16. The system of claim 15, wherein the data model comprises a relational schema specifying an organization of tables, columns, and keys defined for the database associated with the data model.

17. The system of claim 15, wherein the operation further comprises:
determining that a user has completed entering the text string in the editing pane provided by the IDE tool; and
highlighting elements of the text string to distinguish different portions of the database statement from one another.

18. The system of claim 15, wherein the text string represents a partially completed database statement, and wherein providing the programming assistance comprises:
predicting, based on the text string, one or more completed elements of the database statement; and
displaying a list of the one or more completed elements in the editing pane.

19. The system of claim 18, wherein at least one of the one or more completed elements is a keyword of a database query language in which the database statement is being composed.

20. The system of claim 18, wherein at least one of the one or more completed elements specifies a name of an element of the data model.

21. The system of claim 15, wherein the IDE tool provides a programming environment used to develop a database-aware application, and wherein the IDE tool includes at least a graphical text editor and a compiler.

22. The method of claim 1, further comprising:
upon identifying an error in the database statement, halting a project build process.

23. The method of claim 1, further comprising:
upon identifying an error in the database statement, presenting an error correction recommendation to a user, and, upon receiving an acceptance of the error correction recommendation, editing the database statement via the IDE tool.

* * * * *